Figure 1:
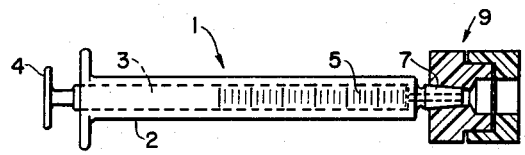

July 22, 1958   J. R. JOYCE ET AL   2,844,025
TESTING FOR SUSPENDED WATER IN WATER-IMMISCIBLE LIQUIDS
Filed March 15, 1957

INVENTORS:
JOHN RUSKIN JOYCE
KEITH ROLLS WILLIAMS
DONALD ANSON

BY: *Robert C. Clement*

THEIR ATTORNEY

— # United States Patent Office 2,844,025
Patented July 22, 1958

2,844,025

TESTING FOR SUSPENDED WATER IN WATER-IMMISCIBLE LIQUIDS

John Ruskin Joyce, Vicars Cross, Chester, Keith Rolls Williams, Northaw, and Donald Anson, Hoole Village, Chester, England, assignors to Shell Development Company, New York, N. Y., a corporation of Delaware Application March 15, 1957, Serial No. 646,441

Claims priority, application Great Britain March 22, 1956

7 Claims. (Cl. 73—53)

This invention relates to a method and a device for testing for the presence of water in suspension in another liquid, i. e. one with which it is immiscible or only partially miscible, especially hydrocarbon liquids such as aviation fuels, for example jet fuel.

It is a matter of importance that there should be available a simple and fast test for the presence of water in suspension in aviation fuels, the desirable minimum sensitivity being the detection of 0.01% by weight of free water, in order that personnel in charge of aircraft fueling installations can rapidly and easily check that fuel being supplied, or stored for supply, to aircraft is substantially free of water in suspension. It is well-known to provide water separating devices in fueling installations at airfields, but there has not been available a simple and fast field test for checking that they are operating efficiently and that the fuel being supplied is uncontaminated. Similarly, while there will usually be water in fuel storage tanks, it is not important as long as it has separated out and is not in suspension in the fuel, and a simple test for checking the condition of fuel in a storage tank or elsewhere in a refueling system is thus required.

Free water in suspension gives rise to far more difficulty in the use of hydrocarbon liquids, because it can be present in much higher concentrations, the solubility of water in such liquids being extremely small (usually in the order of 0.04%). Moreover, hydrocarbon liquids, especially fuels such as aviation gasoline and jet fuel, are normally saturated with dissolved water and this is taken into account in the design of the equipment in which such hydrocarbon liquids are used and in the use of small quantities of anti-icing additives, so that such small amounts of dissolved water do not interfere with the use of such liquids. When suspended free water is present, however, it is likely that the necessarily higher concentrations cannot be accommodated by the system in question and will not be rendered innocuous by the amount of anti-icing additive which may be present in the fuel.

The usual way that water in suspension has until now been detected in the field is by visually examining the liquid in question for cloudiness. This will suffice for large concentrations of water if a very strong light is shone on the sample of liquid, but usually it is necessary to detect smaller concentrations than are readily apparent from the cloudiness of the liquid and without the aid of a strong light.

Figure 2:
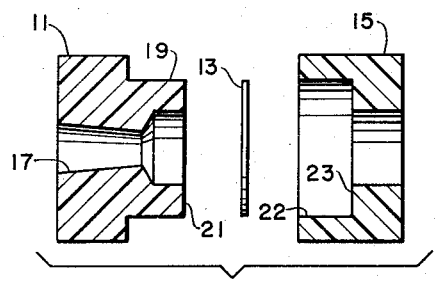

It is accordingly a principal object of this invention to provide a simple and fast method of detecting the presence of suspended free water in water-immiscible liquids. A more particular object of the invention is to provide such a method which is applicable to hydrocarbon liquids, especially hydrocarbon distillate fuels. Still another object is to provide a simple and robust device by which such a method can be applied with reliable accuracy in the field. Other objects will be apparent in the following description and discussion of the invention which will be made with reference to the accompanying drawing wherein:

Figure 1 is a view of a combination device for the detection of suspended free water in accordance with the invention, and Figure 2 is an exploded view of a sub-assembly of the device of Figure 1.

In accordance with the invention it has been found that suspended free water can be quickly and accurately detected in water-immiscible liquids by passing a sample of the liquid through a liquid-pervious light-colored, preferably white, sheet material or diaphragm, such as a piece of filter paper, on the surface of which has been deposited a dry, water-soluble colored powder or a dry water-soluble powder the ingredients of which react in the presence of water to give a colored material which may be either water-soluble or not. In any case the powder and any reaction products thereof must be insoluble in the water-immiscible liquid being tested. The sheet material on the surface of which the powder is provided absorbs, and is colored by, the aqueous solution of the coloring mattter or accepts colored reaction product by filtration where it is insoluble in water. It is desirable that the contacting of the liquid with the substances above should be accelerated and rendered more quantitative by causing a sample of the liquid to flow through them in an organized manner so that substantially the whole of the water in a known volume of the liquid renders its presence evident by the above mechanism.

Accordingly the sample of liquid may be caused to flow through a sheet of a material such as filter paper, one surface of which is coated with a powder containing or consisting of a dye or like coloring matter which is soluble in water (but insoluble in the non-aqueous fluid). Alternatively the paper may be coated with two or more substances which are soluble in water and react therein to form a highly colored water soluble or insoluble product which is insoluble in the liquid and which differs in color from the dry mixture. The paper may be coated with a substance which is soluble in water, the paper itself being impregnated with another substance (for example by dipping the paper in an aqueous solution of the substance and then drying the paper) with which the aqueous solution of the coating substance reacts or associates to give a color detectable substance. The powder is preferably applied most easily and simply by merely brushing it on the sheet material, or an amount of the powder can be placed on the sheet material and the excess shaken off, or the sheet material can be soaked in a suspension of the powder in a light hydrocarbon liquid and then drained.

In the foregoing embodiments it is preferable for best accuracy that the surface of the sheet towards which the liquid flows is coated since the coloring substance is wetted by the water before any substantial amount of the water is absorbed by the sheet material itself. Preferably also it is arranged that a part of the sheet, for example and preferably an annular edge part, is protected from the sample, so that the presence of water in suspension in the sample leads to contrasting coloration of different parts of the sheet.

In testing by a method according to the present invention, if there is any water in suspension in the liquid, some of the dye or like coloring matter will dissolve in the water droplets, and when the latter are absorbed, for example on a sheet of filter or blotting paper, the absorbing body is dyed and thus becomes highly colored. Where part of a sheet of filter paper for example is protected from the sample, the contrast in coloration between the two parts can enable very small proportions of water to be detected.

Suitable dyes are crystal violet, fluorescein, Auramine 0.150 and Rhodamine B 500. Using fluorescein, illumination by ultraviolet light is required to show the contrast to the best effect.

Suitable water soluble substances which react in solution are, for instance, ferrous ammonium sulfate and potassium ferricyanide; ferric alum and potassium ferrocyanide; and potassium ferrocyanide and ferrous ammonium sulfate which react to give Turnbull's Blue or Prussian Blue. The preferred material is a ground powder mixture of potassium ferricyanide and ferrous ammonium sulfate in roughly equal proportions by volume. This mixture is especially sensitive and stable in storage. The dry crystals may be finely ground and mixed and the paper coated with this dry mixture which is a very pale greenish color. Another suitable combination is ferric alum and potassium thiocyanate which produces a deep red color. It will be appreciated that alternative methods of applying these salts are possible such as the impregnation of the paper with a solution of one of the salts, drying, followed by a coating of the finely ground second salt. Many combinations of organic and inorganic substances are possible but these serve to indicate the possibilities. The use of such reactive substances is preferred because a much higher concentration of the powder can be applied to the sheet material without producing any appreciable color.

Further, according to the present invention a device for detecting free water in suspension in another liquid comprises a sheet of water absorbent material held in position across a liquid flow channel, the sheet having a coating of a powder containing or consisting of a dye or like coloring material which is soluble in water and is highly colored or forms colored material when in aqueous solution but insoluble in the water-immiscible liquid. Preferably the liquid flow channel is one passing through a capsule, which is constructed in two parts that can be removably attached together, the sheet being inserted between the two halves and clamped in position by them when they are fitted together. The two halves may for example screw together or push fit together; however the seal should be liquid-tight. The capsule may be wholly or partly transparent to enable the sheet to be observed without dismantling the capsule. Preferably the two ends of the channel through the capsule are arranged so that they can be quickly and easily joined to inlet and outlet conduits. It will be appreciated that such a capsule is a simple device of small cost which can be discarded when once used, and that supplies of such capsules, sealed against the atmosphere, could be made available at a refueling installation for example.

The capsule may be arranged so that one end of the channel is attached, for example by a push fit, on to the nozzle of a small syringe, the other end of the channel being immersed in the liquid in operation and a sample being drawn through the capsule by operating the syringe. Other suitable suction devices, for example, a flexible bulb or bellows type pump, or a filter pump, may of course be used instead of the syringe, for drawing the sample of liquid through the capsule, or the device may be incorporated in the nozzle of a pipette or like device.

A device according to the present invention may be incorporated in a bleeder or by-pass channel provided on a liquid supply and/or storage system. For example, it may form part of a cock-controlled outlet from a storage tank, such that on opening the cock a small sample of liquid from within the tank flows through the device under the hydrostatic head of liquid in the tank. The device may also be inserted in a cock-controlled by-pass channel on a pipeline or the like, for example the delivery nozzle of an aircraft refueling system, the channel interconnecting points on the pipeline between which there is normally a pressure difference, so that on opening the cock, flow takes place through the by-pass channel and thus through the device.

In such cases, the device is preferably arranged so that it can quickly be replaced once a positive reaction has been obtained.

Further the device may be arranged to a pair of inlet and outlet conduits, the arrangement being such that with the device in position a by-pass channel is formed between two points on a pipeline, through which channel fuel can be allowed to flow when the device is in position.

The present invention also comprises a method of fueling an aircraft wherein prior to or simultaneously with the introduction of fuel into the aircraft tanks, the fuel, or a sample portion thereof, passes through a device as aforesaid so as to provide a visual indication of the existence of free water in the fuel, and of the consequential need to interrupt fueling operations.

A device according to the present invention may also be incorporated in one end of a tube or similar arrangement, that end, in operation, being inserted under the surface of the liquid to be tested, while the other end is left open, so that a sample of the liquid is forced up through the sheet under hydrostatic pressure. The device might for example be inserted in a sampler for withdrawing samples of liquid from a storage tank at various levels.

Turning now to the drawing, Figure 1 illustrates a preferred device according to the invention comprising a syringe 1 having a casing 2, a plunger 3, a plunger handle 4, a volumetric graduated scale 5 on the casing, and a nozzle end 7, on which nozzle end is attached a capsule assembly 9. Figure 2 is an enlarged exploded view of the embodiment of capsule assembly 9 shown in Figure 1, consisting of a first clamping member 11, a sheet of coated porous paper 13 such as described above, and a second clamping member 15. The first clamping member 11 is adapted to push fit onto the nozzle 7 of the syringe 1 by means of an axial bore therethrough which has a conical surface 17 arranged to frictionally engage nozzle 7, and also has on the opposite end thereof a male protrusion 19 which has a clamping surface 21 in a flat transverse plane adapted to press against the paper 13 on an annular surface thereof, whereby only a center portion of the paper 13 is exposed to the axial bore. The second clamping member has a female depression formed by surface 22 conformable to the protrusion 19 of the first clamping member 11 and containing clamping surface 23 which is also in a flat transverse plane parallel to the plane of clamping surface 21 and of the same dimensions, thereby pressing on an annular surface of paper 13 on the opposite side from and coextensive with clamping surface 21. Through the second clamping means 15 is also an axial bore in register with the axial bore of the first clamping means 11, whereby only the central portion of the paper 13 is exposed thereto. The surface 22 is of only slightly less axial depth than is the surface 19 in order that clamping surfaces 21 and 23 are pressed tightly against the annular portion of paper 13, whereby liquid drawn through the axial bores of the clamping members is also drawn through the central portion of the paper 13 but is precluded from coming into any substantial contact with an annular portion thereof.

A simple arrangement that has been used consists of a circular piece of Whatman No. 4 filter paper or blotting paper (a satisfactory weight of blotting paper is 38 to 48 lbs. per ream), approximately 1 cm. in diameter, clamped between the two halves of a capsule of transparent polymethyl methacrylate plastic material, such as illustrated in Figure 2. Only the center part of the paper up to a radius of approximately 0.25 cm. lay across the channel. One end of the channel through the capsule was pushed on to the end of the nozzle of a hypodermic syringe, forming a combination such as is illustrated in Figure 1. The surface of the filter paper facing towards that end of the channel away from the syringe was covered with a fine layer of powdered crystal violet, such that the paper had a pale violet coloration. The body of the syringe was graduated in cubic centimeters. In operation the open end of the capsule was inserted under the surface of the liquid to be tested, with the plunger of the syringe pushed home. The plunger was then withdrawn to draw a 5 cc. sample of the liquid through the capsule. It was found that with as little as 0.005% of free water in suspension, there was a distinct contrast between the coloration of the central and edge parts of the filter paper, the latter having been protected from the sample and retaining substantially its original coloration. With 0.01% of free water the contrast was very pronounced.

In the foregoing simple arrangement the paper can alternatively be coated with a finely ground mixture of roughly equal parts of ferrous ammonium sulphate and potassium ferricyanide to give a very pale green test paper. On drawing the 5 cc. sample of liquid through the capsule .002% free water produced a blue central area on the paper giving a very distinct contrast. The depth of this blue area increased with free water content up to .02%.

While as illustrated above, white paper filter paper is the preferred material of which to make the liquid-pervious diaphragm on which the powder is deposited, it is also possible to successfully perform the test with diaphragms made of such material as cloth, for example a synthetic fiber cloth of a polyamide, such as nylon, or glass or cotton cloth.

In the practice of the invention, the sensitivity of the test is to a large extent dependent upon the ratio of the volume of liquid drawn through the diaphragm to the area of the diaphragm exposed to the liquid. It has been found that the above ratio of cubic centimeters liquid to square centimeters of "working" area of diaphragm should be at least 5 centimeters, and preferably at least 15 centimeters. An upper limit on this ratio is required however to avoid washing the powder too deeply into the surface of the diaphragm, thus lightening the color obtained. Accordingly this ratio should not be greater than 100 centimeters and preferably not greater than 50 centimeters. It is also preferred to test a sample of liquid from about 1 to 50 cubic centimeters in volume, more especially from about 5 to 10 cubic centimeters, and this accordingly imposes preferred limitations on the area of the filter paper or other liquid-pervious diaphragm through which the liquid is drawn, by direct arithmetic relation.

As additional examples of the invention, a large number of tests have been carried out using various dyes and dye-forming reagents and on various kinds of water-immiscible liquids. One series of tests was carried out according to the above-described procedure using diaphragms made by brushing crystal violet onto the surface of Whatman No. 4 filter paper. The diaphragms were about 1 centimeter in diameter and were clamped in a capsule such as illustrated in Figure 2 by which the central area of the diaphragm was 4.8 millimeters in diameter. Samples of a volume of 5 cubic centimeters were drawn through these diaphragms, giving a volume/area ratio of 28 centimeters. The test was applied to samples of liquids listed in Table I, a positive test indicating a readily discernible color difference between the center portion of the diaphragm and the annular portion, and a negative test indicating no such color difference:

Table I

| Liquid Tested | Reaction of Test to Dry Liquid | Reaction of Test to Liquid Sample Containing Suspended Free Water |
|---|---|---|
| Regular automotive gasoline | Negative | Positive. |
| Premium gasoline containing isopropanol. | do | Do. |
| Aviation gasoline | do | Do. |
| Premium Gasoline containing phenylboron oxide. | Complete Disk Darkened Slightly. | Do. |
| Catalytically cracked gasoline | Negative | Do. |
| Kerosene containing 20 p. p. m. of an anti-corrosion agent comprising polymerized linoleic acids. | do | Do. |
| JP-4 jet fuel | do | Do. |
| JP-5 jet fuel | do | Do. |

It will be noticed that a positive indication was obtained in the case of each sample containing suspended free water. The gasoline which gave the slightly darkened diaphragm did not in any way invalidate tests on this gasoline containing free water, which produced the usual highly colored spot in the center of the diaphragm. It is also of interest to note that the presence of isopropanol in gasoline solution had no effect although crystal violet is highly soluble in pure isopropanol.

In another series of tests the powders listed in Table II were used as water sensitive materials.

Table II (1) Crystal violet powder
(2) Potassium ferricyanide/ferrous ammonium sulfate mixture
(3) Potassium ferrocyanide/ferric ammonium sulfate mixture
(4) Potassium thiocyanate/ferric ammonium sulfate mixture
(5) Potassium ferrocyanide/ferrous ammonium sulfate mixture The tests with these powders showed that while free water gave the desired change in coloration, the mixtures were completely insensitive to dry (i. e., no suspended free water) alcohols, benzene, carbon tetrachloride, solvent naphtha and all liquid hydrocarbon fuels normally used.

In some cases a liquid upon which the test is to be applied will contain basic additives, such as a mixture of alkyl phosphates and fatty amines, which may interfere to some extent with the test. It has been found that any such interference with the test can be overcome by the incorporation of an acid in the water-detecting powder, especially tartaric acid in small concentrations. Accordingly it is preferred to use the color-forming powders described herein in the form of a mixture with a small amount of an organic polybasic hydroxy acid such as tartaric acid.

We claim as our invention:

1. A method of detecting the presence of suspended free water in a water-immiscible liquid which comprises passing a sample of said liquid through a liquid-pervious light-colored sheet material on the surface of which has been deposited a dry powdered material insoluble in said liquid and selected from the group consisting of a water-soluble dye and a mixture which in the presence of water reacts to form a substance differing in color from said mixture.

2. A method in accordance with claim 1 wherein the dry powdered material also contains a minor amount of tartaric acid.

3. A method of detecting the presenec of suspended free water in a liquid hydrocarbon distillate which comprises passing a sample of the distillate through a central portion only of a sheet of porous paper on the surface of which has been deposited a dry powdered dye which is insoluble in said distillate and soluble in water.

4. A method in accordance with claim 3 wherein the dye is crystal violet.

5. A method of detecting the presence of suspended free water in a liquid hydrocarbon distillate which comprises passing a sample of the distillate through a central portion only of a sheet of porous paper on the surface of which has been deposited a dry powdered mixture which is insoluble in said distillate and which in the presence of water reacts to form a substance differing in color from said mixture.

6. A method in accordance with claim 5, wherein the mixture is selected from the group consisting of: potassium ferricyanide and ferrous ammonium sulfate; potassium ferrocyanide and ferric ammonium sulfate; potassium thiocyanate and ferric ammonium sulfate; and potassium ferrocyanide and ferrous ammonium sulfate.

7. A method in accordance with claim 6 wherein the mixture consists essentially of potassium ferricyanide and ferrous ammonium sulfate in approximately equal volumes and also contains a minor amount of tartaric acid.

References Cited in the file of this patent

UNITED STATES PATENTS

| | | |
|---|---|---|
| 2,276,841 | Hanson | Mar. 17, 1942 |
| 2,761,312 | Line | Sept. 4, 1956 |